Nov. 13, 1951 H. C. PYE 2,574,887

SUBSTATION CIRCUIT HAVING MANUAL CONTROL OF RECEIVING AND TRANSMITTING EFFICIENCY

Filed April 30, 1949 3 Sheets-Sheet 1

INVENTOR
HAROLD C. PYE
BY Chas. Tu. Candy.
ATTORNEY

Nov. 13, 1951 H. C. PYE 2,574,887

SUBSTATION CIRCUIT HAVING MANUAL CONTROL OF RECEIVING AND TRANSMITTING EFFICIENCY

Filed April 30, 1949 3 Sheets-Sheet 2

INVENTOR.
HAROLD C. PYE
BY
ATTORNEY

Nov. 13, 1951 H. C. PYE 2,574,887

SUBSTATION CIRCUIT HAVING MANUAL CONTROL OF RECEIVING AND TRANSMITTING EFFICIENCY

Filed April 30, 1949 3 Sheets-Sheet 3

*INVENTOR.*
HAROLD C. PYE

*BY* [signature]

ATTORNEY

Patented Nov. 13, 1951

2,574,887

UNITED STATES PATENT OFFICE 2,574,887

SUBSTATION CIRCUIT HAVING MANUAL CONTROL OF RECEIVING AND TRANSMITTING EFFICIENCY

Harold C. Pye, Oak Park, Ill., assignor to Automatic Electric Laboratories, Inc., Chicago, Ill., a corporation of Delaware Application April 30, 1949, Serial No. 90,745

7 Claims. (Cl. 179—81)

The present invention relates to telephone circuits in general and more particularly to improved substation telephone circuits of the variable type employing circuit changing means under the control of the subscriber to change the receiving efficiency, the transmitting efficiency, or both transmitting and receiving efficiency, or the ratio of transmitter to receiver efficiencies, as a regular part of the substation equipment.

While the invention does not depend upon any particular type of receiver unit to accomplish the intended purpose, the drawings illustrate one method of a practical application of the invention in which an electrical-powered high efficiency receiver unit of the type such as shown in the Woodruff et al. Patent 2,241,105, issued May 6, 1941, is used.

It has been found that when a high efficiency receiver unit, such as disclosed in the above-mentioned patent, is substituted for a regular telephone receiver in a telephone system using common battery for talking purposes, the output level of the high efficiency receiver is from 12 to 15 decibels higher than the regular receiver. Due to this high output level, it is especially desirable to use such a receiver in conjunction with an improved substation circuit, when the substation telephone set is destined to at times be used under the following conditions in which: The subscriber has defective hearing, or the telephone is placed in a noisy location, or weak received voice signals due to long distance or conference connections. By the operation of a switch located at the substation, as described later on in this specification, improved transmitting and receiving efficiency is attained during the abovenoted conditions, while still providing normal efficiency during normal operating conditions.

It is, therefore, a principal object of the present invention to provide an improved substation telephone circuit employing apparatus at the substation which will permit a maximum of intelligibility of a telephone conversation.

A further object consists in the adaptation of this improved substation circuit and apparatus to provide a substation telephone set for aiding persons having defective hearing, for preventing transmission of interference due to noisy locations of the telephone set, for aiding subscribers during receipt of weak signals due to long distance or conference connections, while still providing normal service during normal operating conditions.

The principal object of the invention is attained primarily in the following manner: By including a resistance in series with the winding of the high efficiency receiver and by including another resistance in multiple with the receiver winding and the first resistance, the combined impedance of the resistances and the high efficiency receiver will approximately equal, or match, the impedance of a regular telephone receiver. Thus, the impedance of the handset including the high efficiency receiver and its circuit will approximately match the impedance of the telephone instrument set in a common battery telephone system. Therefore the output level of the high efficiency receiver unit will approximately equal the output level of the regular telephone receiver. The application of the high efficiency receiver unit at a subscriber station depends upon the use of convenient and simple means of controlling the efficiencies of the receiving unit, transmitting unit and/or the ratio of receiving to transmitting efficiency by the subscriber.

When the substation set is to be used by a subscriber having defective hearing, means is provided and operated by the subscriber for excluding the resistances from the high efficiency receiver circuit to thereby increase the output level of the receiver.

When the substation is placed in a noisy location, means is provided and operated by the subscriber during listening for excluding the resistances from the high efficiency receiver circuit and for inserting a condenser in shunt of the transmitter to thereby increase the receiver output level and to decrease the transmission level of the transmitter. The means is released by the subscriber while talking to re-introduce the resistances into the receiver circuit and to remove the condenser from the transmitter circuit to thereby reduce the receiver output level and increase the transmitter transmission level. This, therefore, reduces the noises received through the side-tone path and increases the received speech level above the noise that reaches the ear around the handset ear cap.

When weak voice signals are received due to a long distance call or the establishing of a large conference call, the output level of the high efficiency receiver is increased in the same manner as described for the subscriber having defective hearing.

It has been found that previously handsets for noisy locations either put a short-circuit across the transmitter or connected a resistive shunt across its terminals by means of a key operated by one of the subscribers. This was effective in reducing or eliminating the noise picked up by the transmitter but it caused a "click" to be heard at the far end when the key was operated. This often gave the impression that the party using the key had hung up. The "clicks" in any case were annoying to both subscribers. In applicant's invention, there have been designed means for reducing the transmission level of the transmitter and for increasing the output level of the high efficiency receiver without changing the D. C. resistance of the substation telephone set so that no "clicks" are heard or no central office equipment is falsely operated.

Other objects and features of the invention will become apparent upon a further perusal of the specification taken in conjunction with the accompanying drawings in which.

Figures 1, 2, 2A, 3:
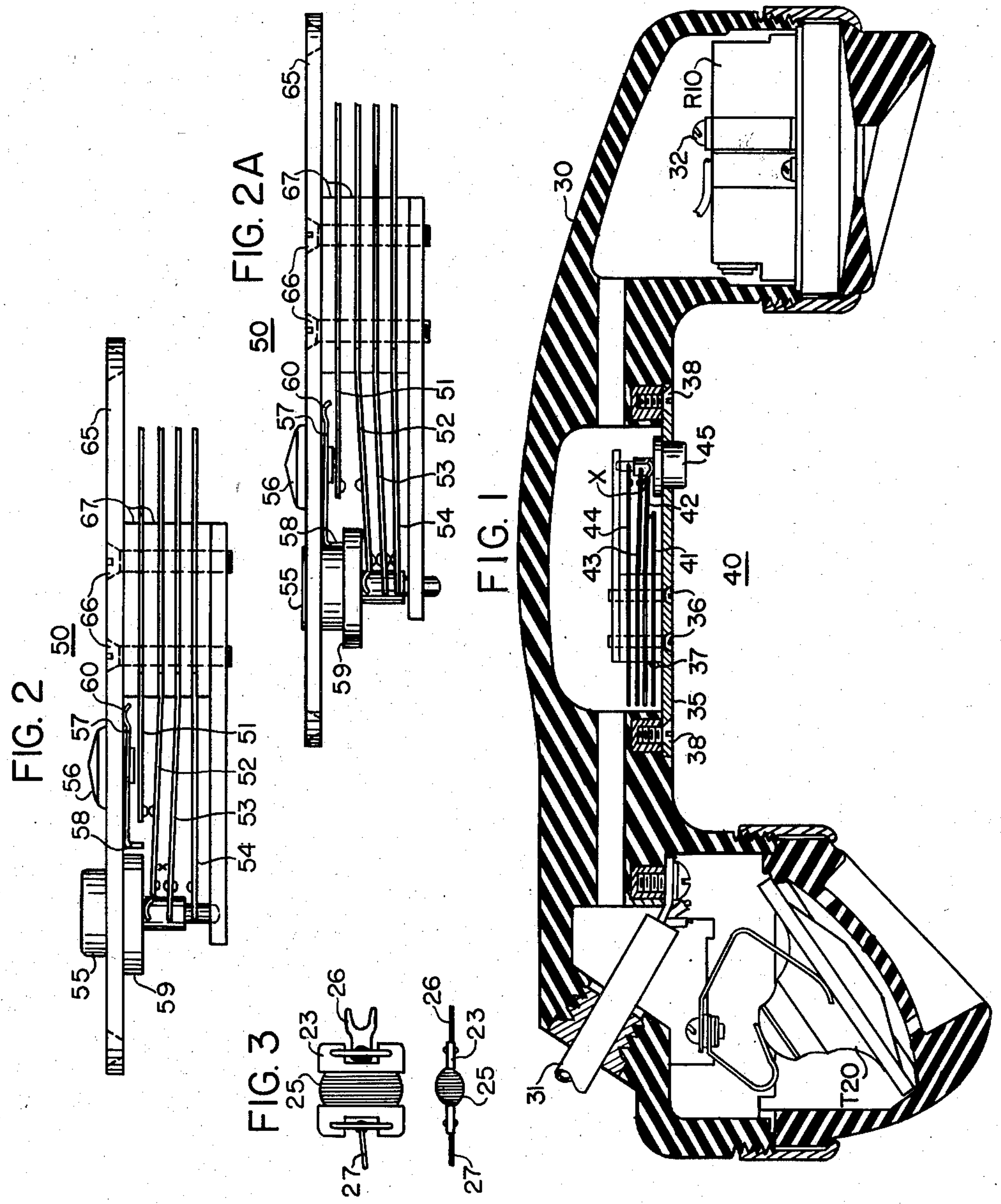
Figure 1 represent a partial cross-section view of a telephone handset showing the location of a regular telephone transmitter, the high efficiency receiver and a push-button switch such as installed in handsets used in noisy locations.
Figure 2 represents an enlarged view of a push-button switch similar to the type shown in the handset of Fig. 1, but modified to include a locking button.

Figure 2–A shows the switch of Fig. 2 in the operated position and with a locking button locking the switch operated.

Figure 3 shows two views of the preferred form of one of the resistances that are included in the circuit of the high efficiency receiver.

Figure 4:
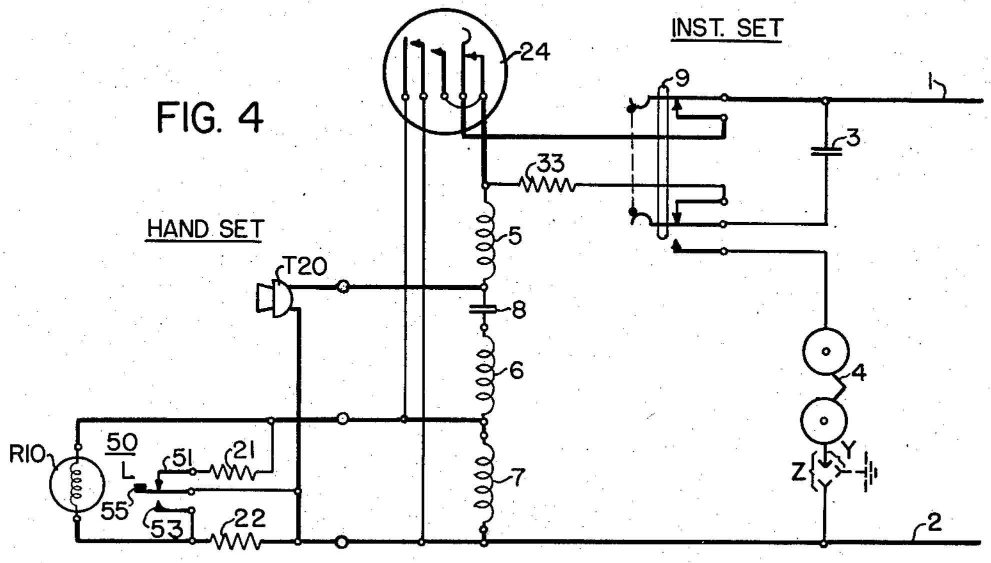

Figure 4 diagrammatically represents a substation circuit having a handset such as shown in Fig. 1, which includes a push-button switch such as shown in Fig. 2, and also includes a pair of the resistances such as shown in Fig. 3.

Figure 5:
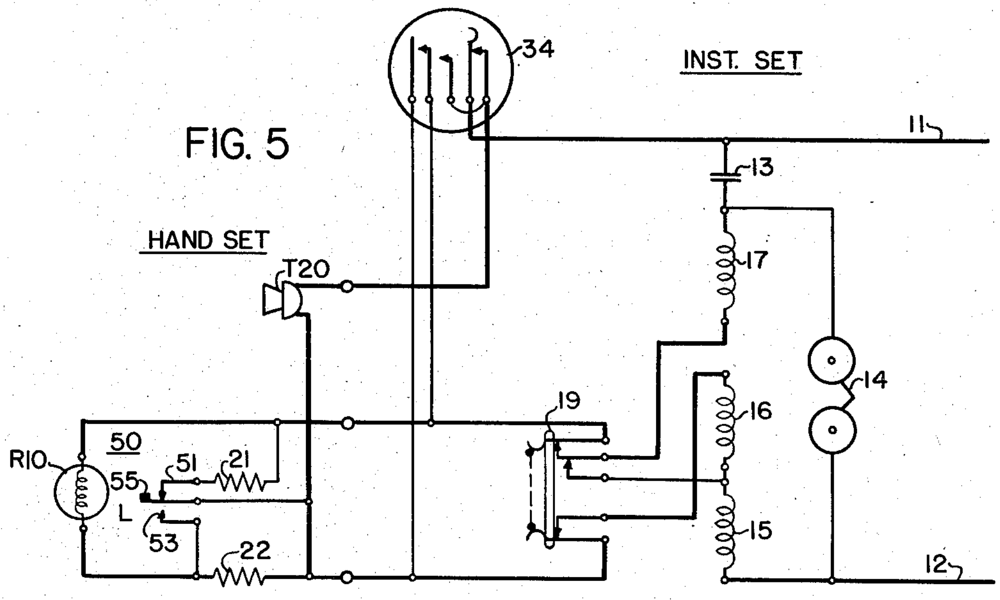

Figure 5 diagrammatically shows a different substation circuit with the same handset equipment as shown in Fig. 4.

Figure 6:
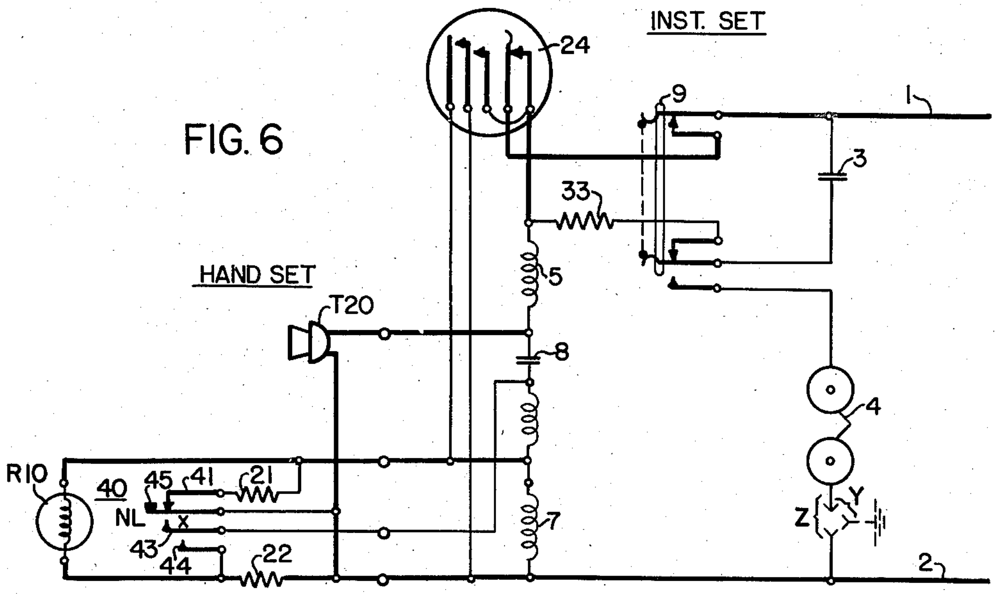

Figure 6 diagrammatically shows the same substation circuit shown in Fig. 4, and also the same handset, with the exception that the non-locking push-button switch of Fig. 1 is used.

Figure 7:
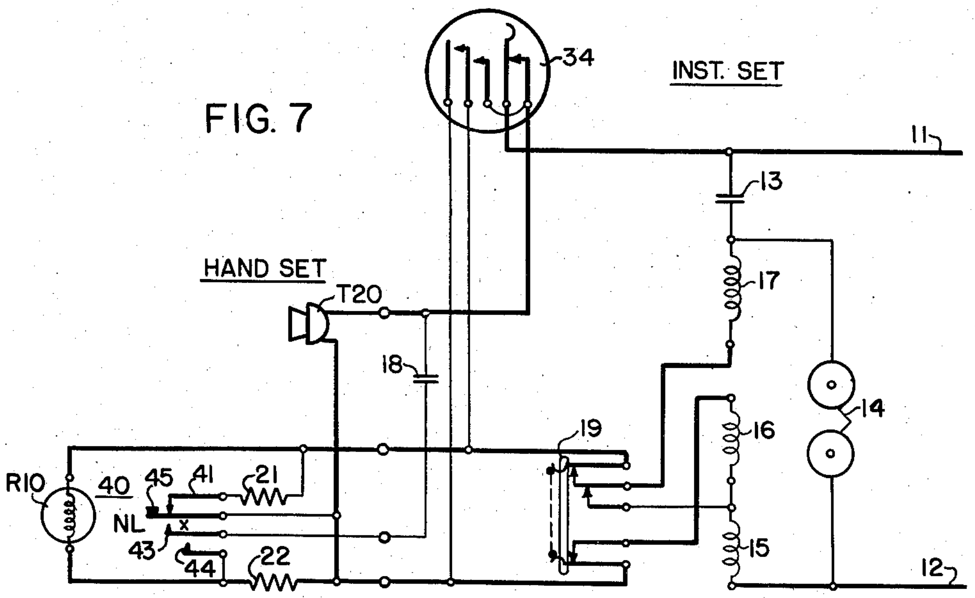

Figure 7 diagrammatically shows the same substation circuit as shown in Fig. 5 and the same handset as shown in Fig. 6.

Referring now to the drawings, Fig. 1 shows the handset 30 partially cut away to reveal the transmitter T20, the high efficiency receiver R10 and the non-locking push-button switch assembly 40. The switch assembly 40 is comprised mainly of contact spring arms 41, 42, 43 and 44, which are mounted one over the other and insulated from each other by members 37, and then secured to plate 35 by means of screws 36. The push-button 45 is shown as being held in its normal position due to the biasing action of spring 42. Upon depressing push-button 42, the *x* contacts between springs 42 and 43 are closed, then the contacts between springs 41 and 42 are opened and then the contacts between springs 43 and 44 are closed. The push-button switch assembly, Figs. 2 and 2–A, is similar to the switch assembly 40 in construction and operation, with the exception that a slidable locking button 56 is provided for locking the push-button 55 in its operated, or depressed, position. A button 56 is slidably mounted in a slot provided in the plate 65 and held in the slot by a flat member 57, which is secured to the lower end of the button 56. The button 56 is frictionally held against the plate 65 due to the spring tension against the lower sides of the plate 65 by the curved end 60 of the member 57. The opposite end, or stop, 58 of the member 57 is bent downward into a plane perpendicular to the member. It will be remembered that when the locking button is moved along its slot, the member 57 is also moved an equal amount in the same direction. Therefore, after the push-button 55 is depressed, button 56 is slid toward button 55 until the end 58 passes over the flange 59 of the button 55 and rests against the main body of the button. It will now be seen that the extreme lower end of the stop 58 bears against the flange 59, which is a portion of the button 55, and then prevents the button 55 from returning to normal. The contact springs 51, 52, 53, and 54, the push-button 55 and the sliding button 56 are now in the operated position as shown in Fig. 2–A and will remain so until the sliding button 56 is moved in a direction away from the push-button 55, at which time the stop end 58 will disengage from the flange 59 and the switch assembly 50 will assume its normal position as shown in Fig. 2.

It will be remembered that the push-button switch assembly 40 is primarily intended for use with a handset in which the telephone set is placed in a noisy location. The push-button 45 is depressed to prevent the outside noise from being transmitted over the line and at the same time increases the output level of the high efficiency receiver R10. The push-button 45 is then released to talk, which also reduces the output level of the receiver. If, at times, there should be no noise and therefore no interference, the handset will provide normal operation merely by non-operation of the push-button 45. The above-mentioned operation will be described more in detail later on in this specification.

It will also be remembered that the push-button switch assembly 50 is primarily intended for use by persons having defective hearing. The push-button 55 is depressed, which increases the output level of the high efficiency receiver R10. If the handset is to be used extensively by persons having defective hearing, the push-button 55 may be locked operated; while on the other hand, if the handset is also used by persons with normal hearing, the push-button 55 is not used and therefore is not locked operated.

It will be appreciated that while the high efficiency receiver R10 of Fig. 1 shows only one terminal 32, two are actually provided, with the second one being located on the other side of the receiver directly behind the illustrated one.

The drawing in Fig. 3 shows the preferred form of non-inductive resistance that is included in the high efficiency receiver circuit, and is comprised mainly of the resistance winding 25 wound around an insulator 23, with one end of the winding terminating in a lug 36 and the other end of the winding terminating in the winding end 27. Two such resistances are used in each receiver circuit and are schematically shown in Figures 4 through 7, in which they are designated by the reference characters 21 and 22, and in combination may be commonly referred to as an "L" type resistance pad. It will be remembered that although the resistances are classed as non-inductively wound, they will each contain, however, a small amount of inductance.

As previously stated, by substituting a high efficiency receiver for a regular telephone receiver, a gain of about 12 to 15 decibels is produced in the receiver output level. Therefore, by giving the resistors 21 and 22 values of approximately 200 ohms and 450 ohms, respectively, a loss of about 12 decibels is introduced between the receiver R10 and the induction coil of the telephone instrument set without appreciably changing the impedance value of the handset circuit with respect to the instrument set. The resistances are normally in the receiver circuit and by depressing the push-buttons either 45 or 55, of the switch assemblies 40 or 50, they are removed from the circuit.

The telephone instrument circuit shown in Figs. 4 and 6 represents equipment and a circuit similar to that disclosed in my prior U. S. Patent 2,214,259, issued September 10, 1940, but modified to include the handset 30, high efficiency receiver R10, resistors 21 and 22, the push-button assembly 50 in Fig. 4 or the push-button assembly 40 in Fig. 6.

It will be appreciated that while Figs. 5 and 7 show the respective handset circuits of Figs. 4 and 6, a telephone instrument circuit of a different type is shown. When the handset having the push-button assembly 50 is used in Figs. 4 and 5, the cable 31 of the handset will contain three conductors, and when the handset having the push-button assembly 40 is used in Figs. 6 and 7, the cable 31 contains four conductors.

Referring now to Figs. 4 and 6, each telephone instrument circuit contains in detail, line conductors 1 and 2, ringer 4, dial 24, switchhook springs 9, induction coil windings 5, 6 and 7, ringing condenser 3, coupling condenser 8, and resistor 33. The switchhook springs 9 are shown as having closed their normally open contacts when the handset is removed from its cradle. The windings 5, 6 and 7 of the induction coil are inductively coupled and serially included in a branch circuit between the line conductors 1 and 2. The coupling condenser 8 is also included in this branch circuit between the two windings 5 and 6. The transmitter T20 is normally connected in shunt with the portion of the branch circuit including the windings 6 and 7 and condenser 8, while the receiver R10 is connected in shunt with the portion of the branch circuit including winding 7.

The ringer 4 is arranged to operate for grounded or metallic ringing, as the case may require. If metallic ringing is to be used, the "Z" wiring shown in the drawings is used, whereas if grounded ringing is to be used, the "Y" wiring illustrated in the drawing is used. In either case the ringer 4 is normally connected to be energized over an operating circuit including line conductor 1, condenser 3, and the lower normally closed contacts controlled by the switchhook springs 9.

Resistor 33 and condenser 3 are connected serially when the handset is removed from the switchhook and they complete an energy absorbing circuit having numerous purposes, for example: Transmission of transient pulses during the operation of dial 24 is prevented, sparking between the impulsing springs is prevented during dialing and any current stored in the condenser 3 is dissipated by resistor 33 subsequent to the removal of the handset from the switchhook after ringing has taken place.

In Fig. 6 is will be seen that connections are provided for directly shunting transmitter T20 with the coupling condenser 8 responsive to depression of the push-button 45.

The telephone instrument circuit shown in Figs. 5 and 7 primarily comprises similar equipment shown in Figs. 4 and 6, but containing certain circuit alterations necessary for the proper operation thereof. Each telephone instrument circuit of Figs. 5 and 7 comprises line conductors 11 and 12, ringer 14, switchhook springs 19, induction coil windings 15, 16 and 17, ringing condenser 13 and dial 34. The switchhook springs 19 are shown as having closed their normally open contacts with the handset being removed from its cradle. In addition, Fig. 7 shows the transmitter shunting condenser 18. The windings 15, 16 and 17 of the induction coil are inductively coupled and serially included in a branch circuit between the line conductors 11 and 12. The ringing condenser 13 is also included in this branch circuit between winding 17 and line conductor 11. The transmitter T20 is normally connected in shunt with the portion of the branch circuit including the winding 17 and the condenser 13, while the receiver R10 is connected in shunt with the portion of the branch circuit including winding 16.

The ringer 14 is shown as operable for metallic ringing and is connected in series with condenser 13 and then connected across the line conductors 11 and 12. It will be noted that the switchhook springs 19 do not disconnect the ringer 14 from the line conductors 11 and 12 responsive to the removal of the handset.

In Fig. 7 it will be seen that condenser 18 and the necessary connections are provided for directly shunting transmitter T20 responsive to the depression of the push-button 45.

Considering now the action of the substation during receipt of talking current and referring in particular to Fig. 4 in which the push-button assembly 50 is used, the following actions will take place after first assuming that an incoming call has been answered responsive to the removal of the handset 30 and that the person using the telephone set has defective hearing. During the time that the substation is receiving incoming signals, an alternating current potential will be present across the line conductors 1 and 2. The current flowing in over line conductor 2 tends to divide into three paths; (1) through the artificial line comprising winding 7; (2) up through push-button 55, contacts 51 and resistor 21; and (3) through resistor 22 and the winding of receiver R10. The current continues on through the winding 6, condenser 8, winding 5, normally closed impulsing springs of the dial 24, upper closed contacts of the switchhook springs 9, line conductor 1 and thence back to the external circuit. Since the push-button assembly 50 is not operated at the present, the output level of the high efficiency receiver R10 is comparable with that of a regular telephone receiver. However, it has been stated that the person using the telephone set has defective hearing, therefore, responsive to the manual depression of push-button 55 (and the locking thereof) the two resistors 21 and 22 are excluded from the circuit of the receiver R10. The operation of push-button 55 opens the above-mentioned number (2) circuit at contacts 51 and short-circuits the resistor 22 at contacts 53. The incoming talking current now divides into two paths: (1) up through winding 7 and (2) through the winding of the receiver R10. The receiver R10 now receives a greater portion of talking current and in so doing, its output level has been increased approximately 12 to 15 decibels, therefore aiding the person having defective hearing to intelligibly hear the conversation. The transmitter T10 is unaffected by either position of the push-button 55, therefore during outgoing transmission, voice current may be assumed to take the following path: from the upper transmitter conductor up through winding 5, the normally closed impulsing springs of the dial 24, the upper closed contacts of the switchhook springs 9, line conductor 1, the external circuit and thence back over line conductor 2 to the lower transmitter conductor.

Referring to Fig. 6, in which the non-locking push-button assembly 40 is now used, the action of the substation during incoming and outgoing talking currents will be discussed. It will be noted that the push-button assembly 40 has an additional contact 43 which is directly connected to a point in the branch circuit between condenser 8 and winding 6. It will be assumed that the telephone set is placed in a noisy location and that an incoming call has been answered responsive to the removal of the handset. During receipt of incoming talking current, the alternating current potential will be present across the line conductors 1 and 2 and take the same paths as previously described for Fig. 4. Since the push-button 45 has not been operated as yet, the output level of the high efficiency receiver R10 is comparable with that of a regular telephone receiver, and since it has been stated that the telephone set is in a noisy location, transmitter T20 will pick up a majority of this noise which in turn will be transmitted to and reproduced by receiver R10 as interference with the incoming signals. The push-button assembly 40 is arranged so that the push-button 45 is to be depressed each time for listening and released each time for talking. Therefore, as push-button 45 is depressed, "X" contacts 43 close to place condenser 8 directly in shunt across the conductors of transmitter T20. Since the capacity of condenser 8 may be about 4 or 5 mf., the transmitting level of transmitter T20 is reduced approximately 10 or 12 decibels, which greatly reduces noise received through the side tone path. Transmitter T20 is also effectively put in series with the line conductors 1 and 2, repsonsive to the closure of contacts 43, to prevent any appreciable impedance change in the handset circuit. As contacts 41 open and contacts 44 close, resistors 21 and 22 are excluded from the circuit of receiver R10 and the output level of the receiver is increased above the noise level as previously described. During outgoing conversation, the push-button 45 is released, at which time the opening and closing of contacts 44 and 41 respectively now include resistors 21 and 22 in the circuit of receiver R10 to decrease its output to normal and the opening of contact 43 removes the condenser shunt from transmitter T20 to increase its transmitting level to normal.

Referring to Fig. 5, in which the locking type push-button assembly 50 is used but in which a different instrument set than Fig. 4 is used, the action of the substation during incoming and outgoing talking currents will be discussed. It will be assumed that an incoming call has been answered responsive to the removal of the handset 30 and that the person using the telephone set has defective hearing. During the time that the substation is receiving incoming signals, an alternating current potential will be present across the line conductors 11 and 12. The current flowing in over line conductor 12 tends to divide into two paths; (1) up through the ringer 14 and (2) through winding 15. The current through the second path (2) now divides into two more paths; (3) through the upper closed contacts of the switchhook springs 19 and (4) through winding 16 and the lower closed contacts of the switchhook springs 19. The current through path (4) tends to divide into two additional paths; (5) up through push button 55, contact 51, resistor 21 and through the upper contacts of switchhook springs 19 and (6) through resistor 22, winding of receiver R10 and through the upper contacts of switchhook springs 19. The current continues on through winding 17, condenser 13, line conductor 11 and back to the external circuit. As previously mentioned, with the push-button 55 at normal, the output level of the high efficiency receiver R10 is practically the same as that for a normal telephone receiver, however with the push-button 55 depressed (and locked if desired) the resistors 21 and 22 are excluded from the receiver circuit and the output level of the receiver is increased as described.

Referring to Fig. 7, in which the non-locking type push-button assembly 40 is used and in which the same telephone instrument set as described for Fig. 5 is used, the action of the substation during incoming and outgoing talking currents will be discussed. It will be assumed that the telephone set is placed in a noisy location and that an incoming call has been answered responsive to the removal of the handset. During receipt of incoming talking current, the alternating current potential will be present across the line conductors 11 and 12 and take the same paths as previously described for Fig. 5. It will be seen that a condenser 18 has been provided (not included in the branch circuit) for being connected directly in shunt across the transmitter T20 terminals responsive to the depression of the push-button 45, however, due to the difference in the circuit of the instrument set of Fig. 7 compared with that shown in Fig. 6, the value of condenser 18 has been increased to approximately 25 mf. Responsive to the operation of push-button 45, the substation set operates as previously described for Fig. 6, in which the transmitting level of transmitter T20 is reduced about 15 decibels due to the shunt imposed by condenser 18 and the output level of receiver R10 increased about 12 to 15 decibels, due to resistances 21 and 22 being excluded from the receiver circuit. The transmission of outside noise is thus reduced, while the receiving output of the incoming voice currents has been increased, thereby aiding the subscriber due to the noisy location of the substation set. When it is desired to send voice currents out, the push-button 45 is released, at which time the condenser shunt is removed from transmitter T20 to restore its transmission level and resistors 21 and 22 are again included in the circuit of receiver R10 to reduce its output level.

The invention having thus been described, what is considered new and is desired to have protected by Letters Patent is pointed out in the following claims.

What is claimed is:

1. In a telephone substation circuit, a pair of line conductors, a transformer having three inductively coupled windings connected between said line conductors, a high efficiency receiver, a receiving circuit including said receiver connected in shunt of one of said transformer windings and in series with the other two of said transformer windings, a first resistor normally connected in series with said receiver in said receiving circuit and a second resistor normally connected in shunt of said receiver in said receiving circuit for reducing the output level of said receiver, and switching means manually operated at certain times to disconnect both said first and second resistors from said receiver for increasing the output level of said receiver.

2. In a telephone substation circuit, a pair of line conductors, a transformer having three inductively coupled windings connected between said line conductors, a handset having a high efficiency receiver, a push-button switch, means for mounting said switch in said handset, a receiver circuit having a first resistor normally connected in series with said receiver in said receiver circuit and a second resistor normally connected in shunt of said receiver in said receiver circuit, a receiving circuit including said receiver circuit connected in shunt of one of said transformer windings and connected in series with the other two of said transformer windings, and means controlled responsive to the manual operation of said push-button switch for excluding both said first and second resistors from said receiver circuit to increase the output level of said receiver.

3. In a telephone substation circuit, a pair of line conductors, a branch circuit including a transformer and connected between said line conductors, a high efficiency receiver, means whereby said receiver is connected to said branch circuit, said receiver, having a circuit including a first resistor normally connected in series with said receiver in said branch circuit and a second resistor normally connected in shunt of said receiver in said branch circuit, a push-button connected in said circuit of said receiver, and contacts controlled responsive to said push-button when operated for excluding both said first and second resistors from said circuit of said receiver to increase the output level of said receiver.

4. A telephone substation circuit such as claimed in claim 3, including a locking means for locking said push-button in its operated position.

5. In a telephone substation circuit, an instrument circuit including a ringer, a transformer and a condenser and having a certain impedance, a handset circuit connected to said instrument circuit and including a transmitter and a high efficiency receiver, said handset circuit having an impedance matching that of said instrument circuit, said efficiency receiver included in said handset circuit having a circuit including a first resistor normally connected in series with said receiver in said handset circuit and a second resistor normally connected in shunt of said receiver in said handset circuit, and switching means operated at times to exclude both said first and second resistors from said receiver circuit without appreciably changing the impedance of said handset circuit with respect to the impedance of said instrument circuit.

6. In a telephone substation circuit, a pair of line conductors, a branch circuit including a transformer and a condenser and connected between said line conductors, a handset, means whereby said handset is connected to said branch circuit, said handset including a transmitter and a high efficiency receiver, said receiver having a circuit including a first resistor normally connected in series with said receiver in said branch circuit and a second resistor normally connected in shunt of said receiver in said branch circuit, and switching means in said handset manually operated to connect said condenser in shunt of said transmitter for reducing the transmission level of said transmitter and to exclude both said first and second resistors from said receiver circuit for increasing the output level of said receiver.

7. In a telephone substation circuit, a pair of line conductors, a branch circuit including a transformer and connected between said line conductors, a high efficiency receiver, means whereby said receiver is connected to said branch circuit, said receiver having a circuit including a first resistor normally connected in series with said receiver in said branch circuit and a second resistor normally connected in shunt of said receiver in said branch circuit, a transmitter connected to said branch circuit and having a circuit including a condenser normally disconnected from said transmitter, a set of contacts connected to said circuits of said receiver and said transmitter, certain ones of said contacts being individual to said receiver circuit and the other of said contacts being individual to said transmitter circuit, and switching means manually operated for controlling said certain ones of said contacts in said receiver circuit to exclude both said first and second resistors from said receiver circuit for increasing the output level of said receiver, and for controlling said other of said contacts in said transmitter circuit to connect said condenser in shunt of said transmitter for reducing the transmission level of said transmitter.

HAROLD C. PYE.

REFERENCES CITED

The following references are of record in the file of this patent:

UNITED STATES PATENTS

| Number | Name | Date |
|---|---|---|
| 2,288,049 | Tillman | June 30, 1942 |
| 2,320,726 | Herckmans | June 1, 1943 |
| 2,337,900 | King | Dec. 28, 1943 |
| 2,417,067 | Farallo | Mar. 11, 1947 |

FOREIGN PATENTS

| Number | Country | Date |
|---|---|---|
| 408,264 | Great Britain | Apr. 3, 1934 |